(12) United States Patent
Moisey et al.

(10) Patent No.: US 6,968,048 B2
(45) Date of Patent: Nov. 22, 2005

(54) AUTOMATIC MESSAGE ACCOUNTING RECORD CREATION SYSTEM AND METHOD

(75) Inventors: Kenneth Andrew Moisey, Olympia, WA (US); John Unsworth, Coquitlam (CA); David S. Carson, Langley (CA)

(73) Assignee: Tekelec, Calabasas, CA (US)

( * ) Notice: Subject to any disclaimer, the term of this patent is extended or adjusted under 35 U.S.C. 154(b) by 247 days.

(21) Appl. No.: 10/324,610

(22) Filed: Dec. 20, 2002

(65) Prior Publication Data

US 2004/0120350 A1 Jun. 24, 2004

(51) Int. Cl.[7] .............................................. H04M 15/00
(52) U.S. Cl. ............................ 379/114.01; 379/115.01; 379/126
(58) Field of Search .......................... 379/111, 112.01, 379/114.01, 114.03, 114.28, 114.29, 115.01–115.02, 379/126, 127.01, 127.05, 133–134

(56) References Cited

U.S. PATENT DOCUMENTS

| | | | | |
|---|---|---|---|---|
| 5,333,183 | A | * | 7/1994 | Herbert ................. 379/112.07 |
| 5,768,352 | A | * | 6/1998 | Elliott et al. ........... 379/112.01 |
| 6,233,313 | B1 | * | 5/2001 | Farris et al. ........... 379/112.01 |
| 6,304,640 | B1 | * | 10/2001 | Darland et al. ........ 379/114.03 |
| 6,351,453 | B1 | * | 2/2002 | Nolting et al. ............. 370/234 |
| 6,483,842 | B1 | | 11/2002 | Mauger |
| 6,504,907 | B1 | * | 1/2003 | Farris et al. .................. 379/35 |
| 6,539,082 | B1 | | 3/2003 | Lowe et al. |
| 6,798,871 | B2 | * | 9/2004 | Richardson ............ 379/114.04 |
| 6,847,710 | B1 | * | 1/2005 | Suda et al. .................. 379/126 |
| 6,876,731 | B2 | * | 4/2005 | Cerami et al. .............. 379/126 |
| 6,891,938 | B1 | * | 5/2005 | Scott et al. ............ 379/112.06 |
| 2002/0150221 | A1 | | 10/2002 | Carson et al. |

OTHER PUBLICATIONS

International Search Report in PCT Application No. 03/40848 (Oct. 14, 2004).

* cited by examiner

*Primary Examiner*—Duc Nguyen
(74) *Attorney, Agent, or Firm*—Jenkins, Wilson & Taylor, P.A.

(57) ABSTRACT

A method and system for generating and providing existing and new message accounting records in a standard format using call data obtained from switching and/or signaling networks is disclosed. A system for providing augmented billing messages includes a message accounting record creation apparatus being in communication with a signaling network and a switching network. The message accounting record creation apparatus receives call records from the signaling network and message accounting records from the switching network and outputs augmented message accounting records. Each of the augmented message accounting records is generated using one of the signaling network call records and one of the switching network message accounting records.

71 Claims, 13 Drawing Sheets

AUTOMATIC MESSAGE ACCOUNTING RECORD CREATION SYSTEM AND METHOD

TECHNICAL FIELD

The present invention relates to communication systems. More specifically, the present invention relates to a method and system for generating and providing existing and new message accounting records in a standard format using call data obtained from switching and/or signaling networks.

BACKGROUND OF THE INVENTION

New network entities and associated regulations have fundamentally changed the structure of current telephony networks in national and international markets. Access has been opened to competitive interconnecting service providers, creating new network configurations and new demands on network resources.

As a result, as different services for wireless, analog and wireline (Time Division Multiplexing—TDM) have manifested themselves, traditional switch vendors have struggled to keep pace with new switch capabilities and the production of necessary "billing records" associated with each new switch. Unfortunately, all too often the introduction of a new capability or feature can be held up as the result of needing a new "billing record" to permit billing of the new feature or capability.

As such, due to the multi-tasking requirements placed upon a switch, as well as the lower priority of producing the billing records, the inherent accuracy of the billing records produced by the switch may be frequently called into question. Specifically, in many switch architectures, the hierarchical processing frequently places less importance on producing a billing record for a call than on the actual completion of the call. In addition, in some unfortunate circumstances, certain callers have fraudulently circumvented the creation of billing records by the switch. As such, not only do timing errors frequently appear in a billing record for a call, but it is also common for the billing record for the call to not even be produced. As a result, numerous calls have been either under-billed or not billed at all.

DETAILED DESCRIPTION

In accordance with an embodiment of the present invention, a communication billing system and method may provide near real-time production and transmission of existing and new billing records, for example, a Billing Automatic Message Accounting (AMA) Format (BAF) record, as a homogenous data stream. In general, the data stream may be provided in a standard format so that the billing records may be used in a service provider's billing system to maximize revenues. The system and method may allow for a data stream of switching network message accounting records, for example, a data stream of BAF records, to be transparently transmitted to billing center(s). The data stream of BAF records may be produced by at least one switch in a switching network in a communication system. In addition, the system and method may augment the data stream with new billing records created using signaling network call records, for example, accounting records from a Signaling System No. 7 (SS7) network. In general, the signaling network call records may be used if at least one switch has failed to produce a switching network message accounting record for a call that was completed, and/or may replace some inaccurate or "suspect" billing records with more accurate billing records produced using messages from a signaling network. The signaling network may produce a data stream of signaling messages, for example, the SS7 network may produce SS7 Integrated Services digital network User Part (ISUP) messages and/or Message Signaling Units (MSUs), which may be received from links in the SS7 network.

In accordance with an embodiment of the present invention, the system and/or method may collect and analyze the signaling messages, for example, the ISUP messages and MSUs, and package each of them into a signaling network call record, for example, a CDR. At the same time, the system and/or method may also collect the billing records normally produced by the switching elements and then may compare the collected records against each other and additional reference data. This comparison may be used to determine:

Which switching network message accounting records may be transparently passed through the system, for example, BAF records produced on behalf of a Remote behind a Host switch, Which new BAF records may be created, for example, calls the switch failed to record, Which switching network message accounting records may be replaced, due to the system and/or method being able to create a more accurate record.

Upon completion of the analysis, the system and/or method compiles a single stream of message accounting records, for example, BAF records, and transparently transmits these message accounting records on to the Billing Center. This transmission may occur using either an AMA TeleProcessing System (AMATPS—X.25) Protocol or an AMA Data Networking System (AMADNS—FTP) Protocol.

Figure 1:
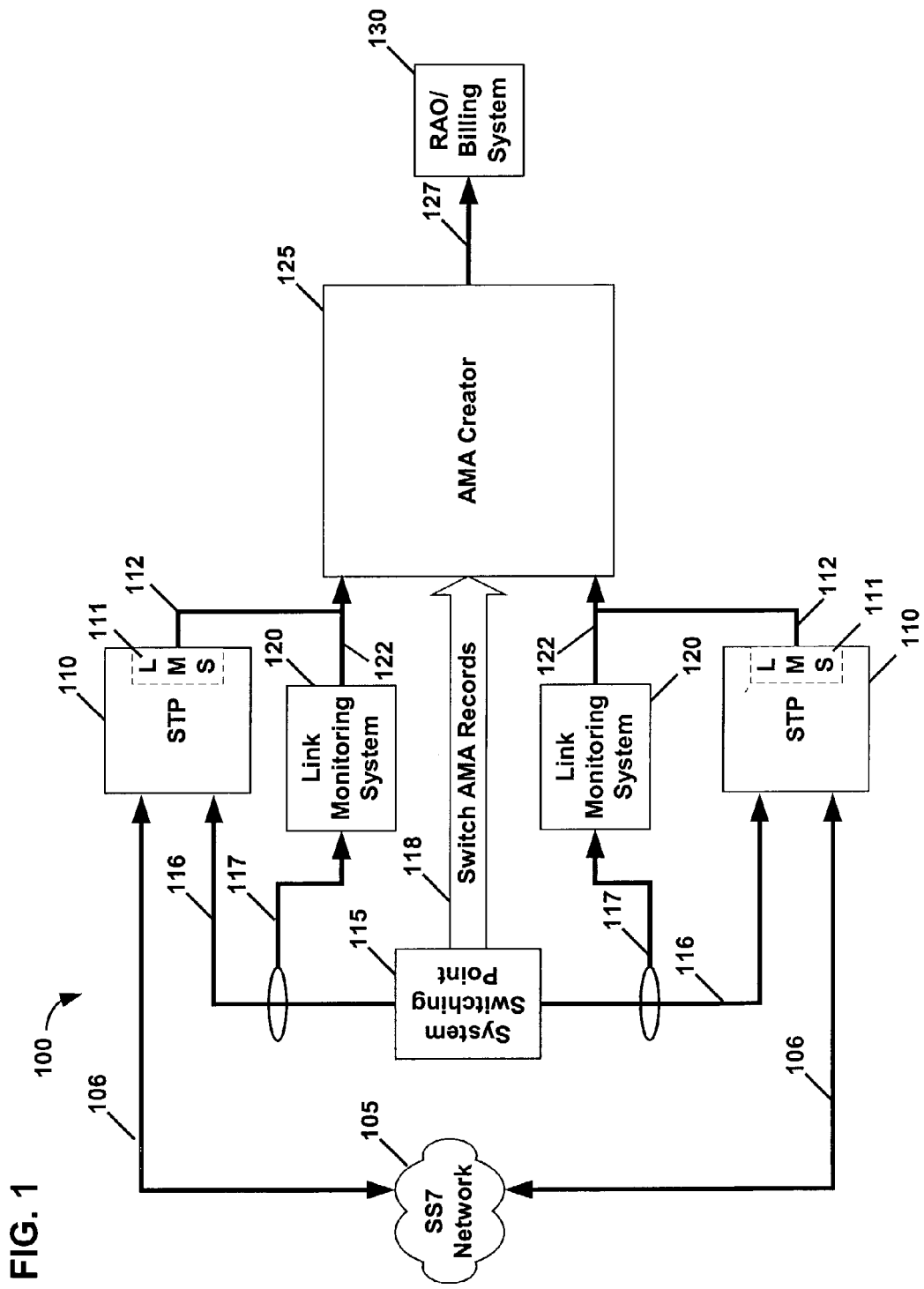
FIG. 1 is a top-level system block diagram for a communication system that generates and provides existing and new automatic message accounting format records in a standard format for use in a call billing system, in accordance with an embodiment of the present invention.

FIG. 1 is a top-level system block diagram for a communication system that generates and provides existing and new automatic message accounting (AMA) format records in a standard format for use in a call billing system, in accordance with an embodiment of the present invention. In FIG. 1, a communication system 100 may include a Signaling System No. 7 (SS7) network 105 in communication with one or more signaling transfer points (STP) 110 over one or more signal communication paths 106, which may be capable of both one-way and two-way communications. SS7 network 105 may, among other things, handle SS7 message traffic and provide a signaling network message for each call that uses SS7 network 105. One or more system switching points 115 also may be in communication with one or more STPs 110 via one or more switch communication paths 116 to forward SS7 messages to one or more STPs 110. In general, each switch communication path 116 may be capable of both one-way and two-way communications. SS7 network 105 may be in communication with one or more link monitoring systems 120 to send signaling network messages, for example, message signal units (MSU), via switch communication path 116 and signaling network message signal path 117. Each signaling network message signal path 117 may complete the communication link between one switch communication path 116 and one link monitoring system 120. Each link monitoring system (LMS) 120 may process the signaling network messages into signaling network call records, for example, CDRs, and send the signaling network call records to an AMA format record creation apparatus 125 via one or more signaling network call record communication lines 122. Likewise, each optionally, STP 110 may, include an LMS component 111 and/or functionality to receive and process the signaling network messages into signaling network call records, for example, CDRs, and then send the signaling network call records to AMA format record creation apparatus 125 via one or more STP call record communication lines 112.

In FIG. 1, each system switching point 115 may be coupled to switching network AMA record communication path 118 and may process the switching network messages into switching network AMA records. Each system switching point 115 may send the switching network AMA records to AMA format record creation apparatus 125 via switching network AMA record communication path 118.

In FIG. 1, automatic message accounting format record creation apparatus 125 may be in communication with a revenue accounting office (RAO) billing system 130 via an augmented network AMA record communication path 127. In general, AMA format record creation apparatus 125 may generate and send the augmented network AMA records to RAO billing system 130 via augmented network AMA record communication path 127. RAO billing system 130 may process the augmented network AMA records into bills for each customer and send the processed bills to each customer. The bills may be printed out and sent as a hard copy as-wellas in electronic format, for example, in an e-mail to each customer, as a billing notice to customers with electronic bill payment and receipt systems, etc.

The numbering scheme begun in FIG. 1 is continued in FIGS. 2 through 13. Therefore, elements numbered in prior figures and that are common to one or more subsequent figures will, in general, continue to be identified by the original number for clarity and to maintain consistency.

Figure 2:
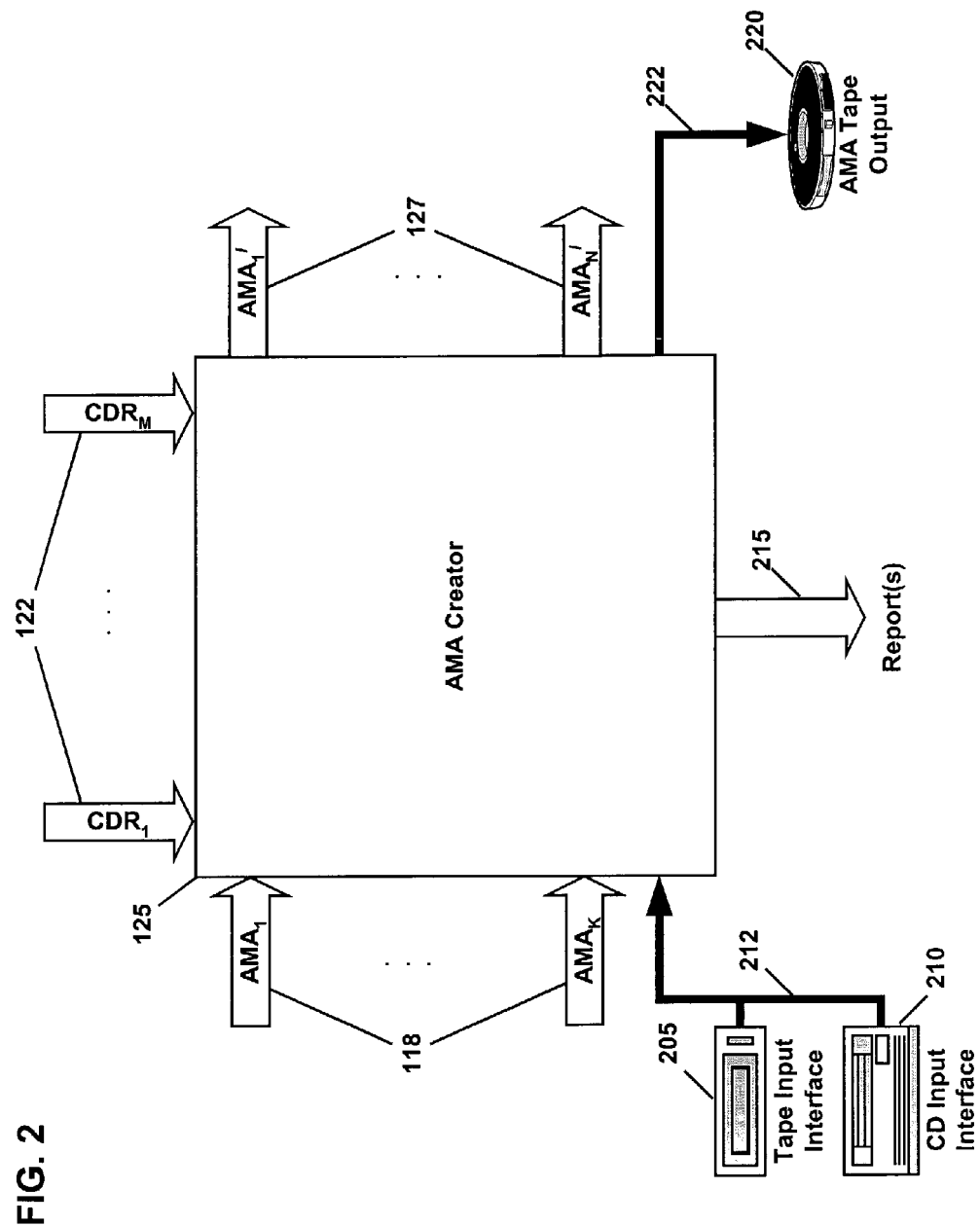
FIG. 2 is a top-level block diagram for an automatic message accounting format record creation system that illustrates data paths into and out of the system, according to an embodiment of the present invention.

FIG. 2 is a top-level block diagram for AMA format record creation apparatus 125 of FIG. 1 that illustrates data paths into and out of the apparatus, according to an embodiment of the present invention. In FIG. 2, multiple switching network AMA record communication paths 118, for example, 1 to k, may be coupled to AMA format record creation apparatus 125. Each switching network AMA record communication path 118 may be used to send the switching network AMA records to automatic message accounting format record creation apparatus 125. Similarly, multiple signaling network call record communication paths 122, for example, 1 to m, may be coupled to AMA format record creation apparatus 125. Each signaling network call record communication path 118 may be used to send the signaling network call records to AMA format record creation apparatus 125. Likewise, multiple augmented network AMA record communication paths 127, for example, 1 to n, may be coupled to AMA format record creation apparatus 125. Each network AMA record communication path 127 may be used to output the augmented AMA records from AMA format record creation apparatus 125. It should be clearly understood that the numbers for the communication paths, that is, k, m and n, may have equal and/or different values in the various contemplated embodiments of automatic message accounting format record creation apparatus 125.

In FIG. 2, AMA format record creation apparatus 125 may be coupled to alternative media input interfaces, for example, a tape input interface 205 and a compact disc (CD) input interface 210 over an alternative media communication path 212. Tape input interface 205 and CD input interface 210 may be used to provide alternative sources for sending the switching network AMA records to AMA format record creation apparatus 125. AMA format record creation apparatus 125 may also be coupled to an AMA tape output device 220 over an output communication path 222. AMA format record creation apparatus 125 may also be coupled to a report communication path 215, which may be coupled to standard storage and/or printing devices for storing and printing of performance reports for AMA format record creation apparatus 125.

Figure 3:
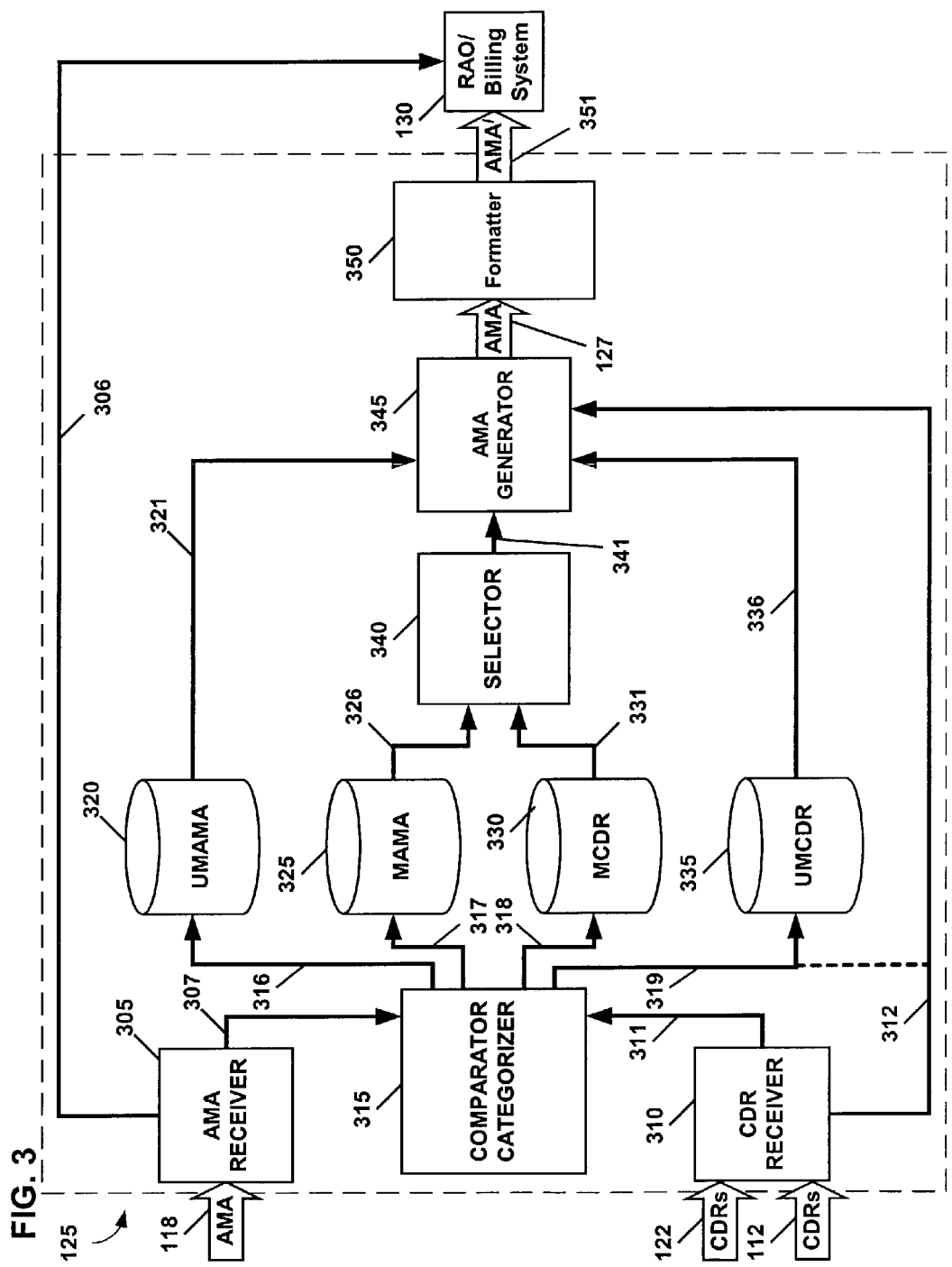
FIG. 3 is a detailed block diagram for the automatic message accounting format record creation system of FIG. 2 that illustrates an architecture for the system, according to an embodiment of the present invention.

FIG. 3 is a detailed block diagram for the AMA format record creation apparatus of FIG. 1 that illustrates an architecture for the system, according to an embodiment of the present invention. AMA format record creation apparatus 125 may include a switching network AMA record receiver component 305 coupled to one or more switching network AMA record communication paths 118. Switching network AMA record receiver component 305 may be coupled to RAO/billing system 130 by a switching network AMA by-pass communication path 306. Switching network AMA record receiver component 305 may also be coupled to a comparison component, for example, a comparator-categorizer 315, by a switching network AMA communication path 307.

In FIG. 3, in accordance with an embodiment of the present invention, AMA format record creation apparatus 125 may include a signaling network call record receiver component, for example, CDR receiver component 310, coupled to one or more signaling network call record communication paths 122 and one or more STP call record communication lines 112. CDR receiver component 310 may also be coupled to comparator-categorizer 315, by a signaling network call record communication path 311. CDR receiver component 310 may be coupled to an unmatched CDR (UMCDR) Storage Subcomponent 335 and an AMA generator component 345 by a signaling network call record by-pass communication path 312.

In FIG. 3, in accordance with an embodiment of the present invention, comparator-categorizer 315 may be further coupled to multiple storage devices. For example, comparator-categorizer 315 may be coupled to an unmatched AMA (UMAMA) storage subcomponent 320 via an UMAMA record communication path 316 and a matched AMA (MAMA) storage subcomponent 325 via a MAMA record communication path 317. Comparator-categorizer 315 may also be coupled to a matched call record, for example, a matched CDR (MCDR), storage subcomponent 330 via a MCDR communication path 318 and an unmatched call record, for example, UMCDR storage subcomponent 335 via an UMCDR communication path 319.

In FIG. 3, in accordance with an embodiment of the present invention, UMAMA storage subcomponent 320 may be coupled to AMA generator component 345 via an UMAMA storage subcomponent communication path 321. UMCDR storage subcomponent 335 may be coupled to AMA generator component 345 via an UMCDR storage subcomponent communication path 336. Similarly, MAMA storage subcomponent 325 may be coupled to a selector component 340 via MAMA storage subcomponent communication path 317. MCDR storage subcomponent 330 may be coupled to selector component 340 via MCDR storage subcomponent communication path 331.

In FIG. 3, in accordance with an embodiment of the present invention, selector 340 may be coupled to AMA generator 345 via selector communication path 341. AMA generator 345 may be coupled to a formatter component 350 via AMA record communication path 127. Formatter component 350 may be coupled to RAO/billing system 130 via formatted AMA record communication path 351.

Figure 4:
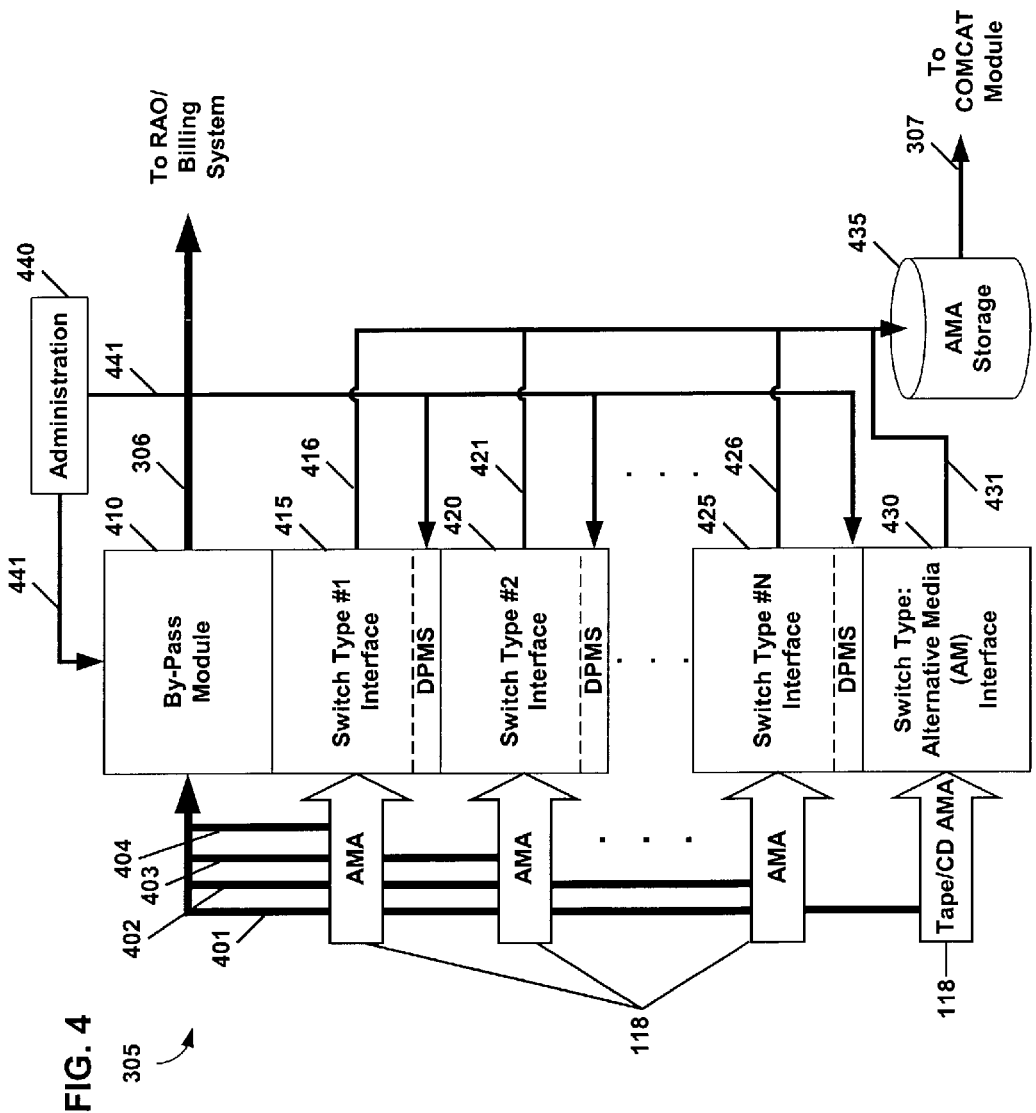
FIG. 4 is a detailed block diagram for a switching network message accounting record receiver component of the automatic message accounting format record creation system of FIG. 2, according to an embodiment of the present invention.

FIG. 4 is a detailed block diagram for switching network AMA record receiver component 305 of FIG. 3, according to an embodiment of the present invention. In FIG. 4, AMA record receiver component 305 may include a by-pass module 410, which may be coupled to switching network AMA record communication paths 118 via AMA record by-pass paths 402, 403 and 404 and alternative media communication path 212 via alternative AMA record by-pass path 401. By-pass module 410 may receive AMA records that are determined not need augmentation by AMA format record creation system 125, for example, AMA records that may be produced on behalf of a remote behind a host switch for which no CDRs are produced. By-pass module 410 may be coupled to RAO/billing accounting office 130 via switching network AMA by-pass communication path 306.

In FIG. 4, in accordance with an embodiment of the present invention, AMA record receiver component 305 may also include multiple types of switch interfaces 415, 420 and 425 coupled to switching network AMA record communication paths 118. Switch interfaces 415, 420 and 425 may be coupled to an AMA storage device 435 via switch interface communications paths 416, 421 and 426. AMA record receiver component 305 may also include an alternative media (AM) interface 430 coupled to alternative media communication path 212. AM interface 430 may be coupled to AMA storage device 435 via AM interface communications path 431. AMA storage device 435 may be coupled to comparator-categorizer 315 of FIG. 3, by switching network AMA communication path 307.

Returning to FIG. 4, in accordance with an embodiment of the present invention, AMA record receiver component 305 may further include an administration module 440, which may be coupled to by-pass module 410, switch interfaces 415, 420 and 425, and AM interface 430 via an administration module communication path 441.

Figure 5:
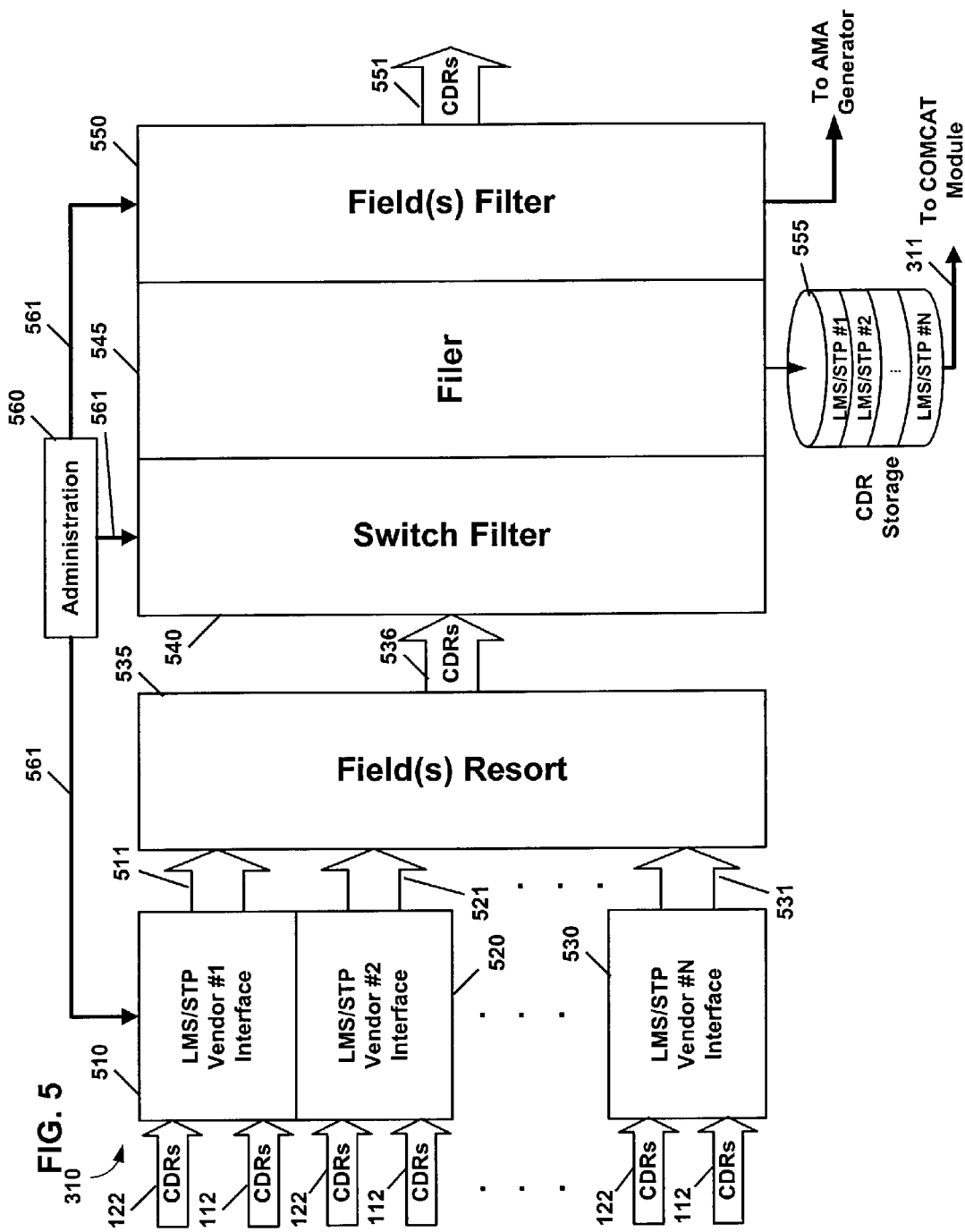
FIG. 5 is a detailed block diagram for a signaling network call record receiver component of the automatic message accounting format record creation system of FIG. 2, according to an embodiment of the present invention.

FIG. 5 is a detailed block diagram for signaling network call record receiver component 310 of FIG. 3, according to an embodiment of the present invention. In FIG. 5, call record receiver component 310 may include multiple LMS/STP vendor interfaces, for example, LMS/STP vendor #1 interface 510, LMS/STP vendor #2 interface 520 and LMS/STP vendor #N interface 530, where N may be any integer value ≧1. Each of LMS/STP vendor interfaces 510, 520 and 530 may be coupled to LMS signaling network call record communication line 122 and LMS STP call record communication line 112. Each of LMS/STP vendor interfaces 510, 520 and 530 may also be coupled to a field resort component 535 via LMS/STP vendor interface communication paths 511, 521 and 531. Field resort component 535 may be coupled to a switch filter component 540 via a field resort component communication path 536. Switch filter component 540 may in turn be coupled to a filer component 545, which may then be coupled to a field(s) filter component 550. Filer component 545 may also be coupled to a call record storage subcomponent 555, which may be coupled to comparator-categorizer component 315 via signaling network call record communication path 311. Field(s) filter component 550 may be configured to output filtered call records, for example, via signaling network call record by-pass communication path 312.

Figure 6:
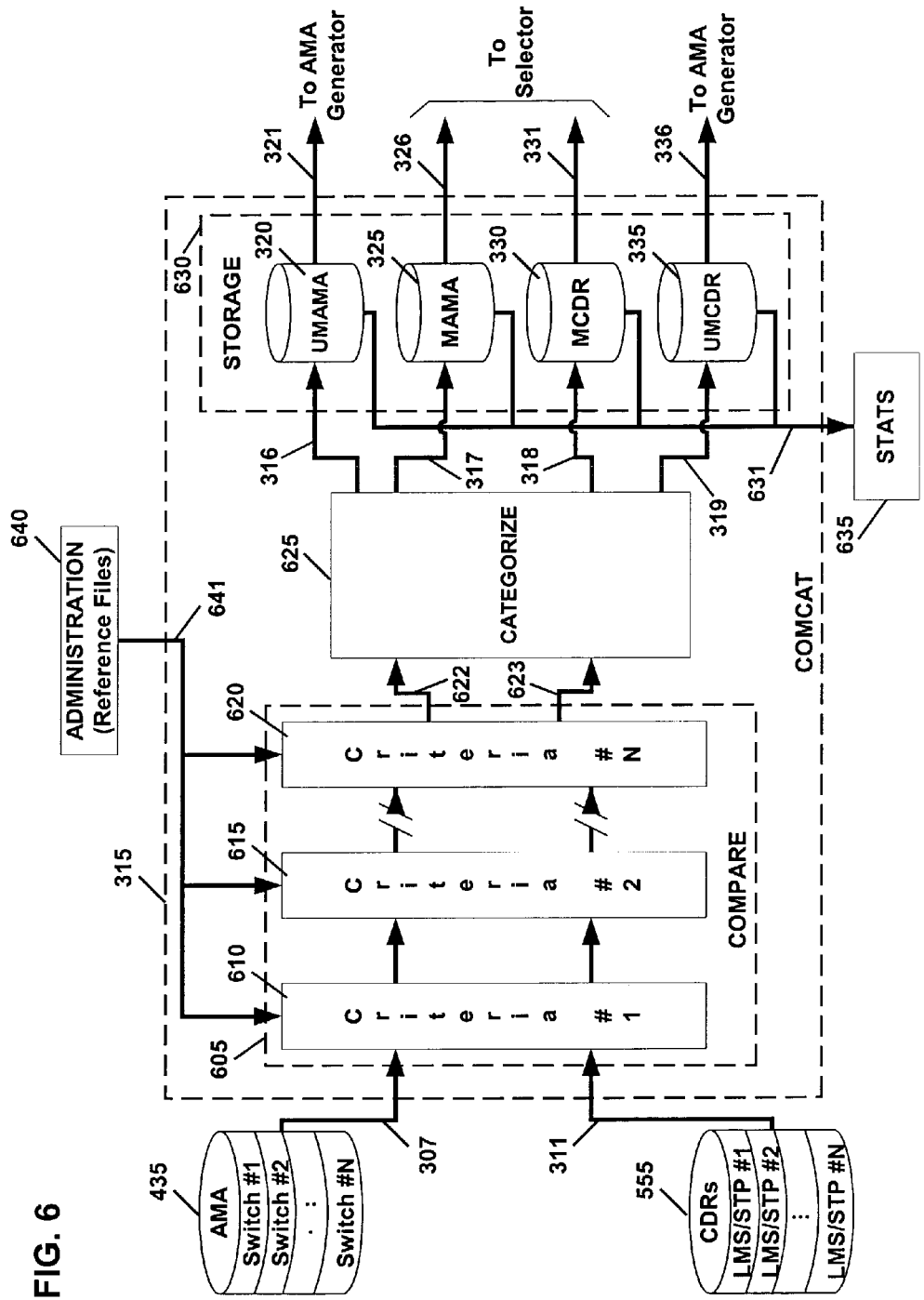
FIG. 6 is a detailed block diagram for a comparison component of the automatic message accounting format record creation system of FIG. 2, according to an embodiment of the present invention.

FIG. 6 is a detailed block diagram for comparison component, for example, comparator-categorizer component 315 of FIG. 3, according to an embodiment of the present invention. In FIG. 6, comparator-categorizer component 315 may include a compare subcomponent 605 with multiple compare criteria units, for example, compare criteria #1 unit 610, compare criteria #2 unit 615, and compare criteria #N unit 620, where N may be any integer value ≧1. In general, compare criteria units 610, 615 and 620 may be coupled in series within comparator-categorizer component 315. Compare subcomponent 605 may be coupled to a categorize subcomponent 625 via compare subcomponent communication paths 622, 623.

In FIG. 6, in accordance with an embodiment of the present invention, storage subcomponent 630 may include UMAMA storage subcomponent 320, MAMA storage subcomponent 325, MCDR storage subcomponent 330 and UMCDR storage subcomponent 335 of FIG. 3. Returning to FIG. 6, UMAMA storage subcomponent 320 may be coupled to categorize subcomponent 625 via UMAMA record communication path 316 and to AMA generator 345 of FIG. 3 via UMAMA storage subcomponent communication path 321. Returning to FIG. 6, MAMA storage subcomponent 325 may be coupled to categorize subcomponent 625 via MAMA record communication path 317 and to selector 340 of FIG. 3 via MAMA storage subcomponent communication path 326. Returning to FIG. 6, MCDR storage subcomponent 330 may be coupled to categorize subcomponent 625 via MCDR record communication path 318 and to selector 340 of FIG. 3 via MCDR storage subcomponent communication path 331. Returning to FIG. 6, UMCDR storage subcomponent 335 may be coupled to categorize subcomponent 625 via UMCDR record communication path 319 and to AMA generator 345 of FIG. 3 via UMCDR storage subcomponent communication path 336. Each of UMAMA storage subcomponent 320, MAMA storage subcomponent 325, MCDR storage subcomponent 330 and UMCDR storage subcomponent 335 may be configured to output statistics 635 via a statistics communication path 631. In general, statistics communication path 631 may be coupled to standard storage and/or printing devices 635 for storing and printing of statistics.

In FIG. 6, in accordance with an embodiment of the present invention, an administration component 640 may be coupled to comparator-categorizer component 315 via administration component communication path 641. Specifically, administration component 640 may be coupled to each of compare criteria #1 unit 610, compare criteria #2 unit 615 and compare criteria #N unit 620 via administration component communication path 641.

Figure 7:
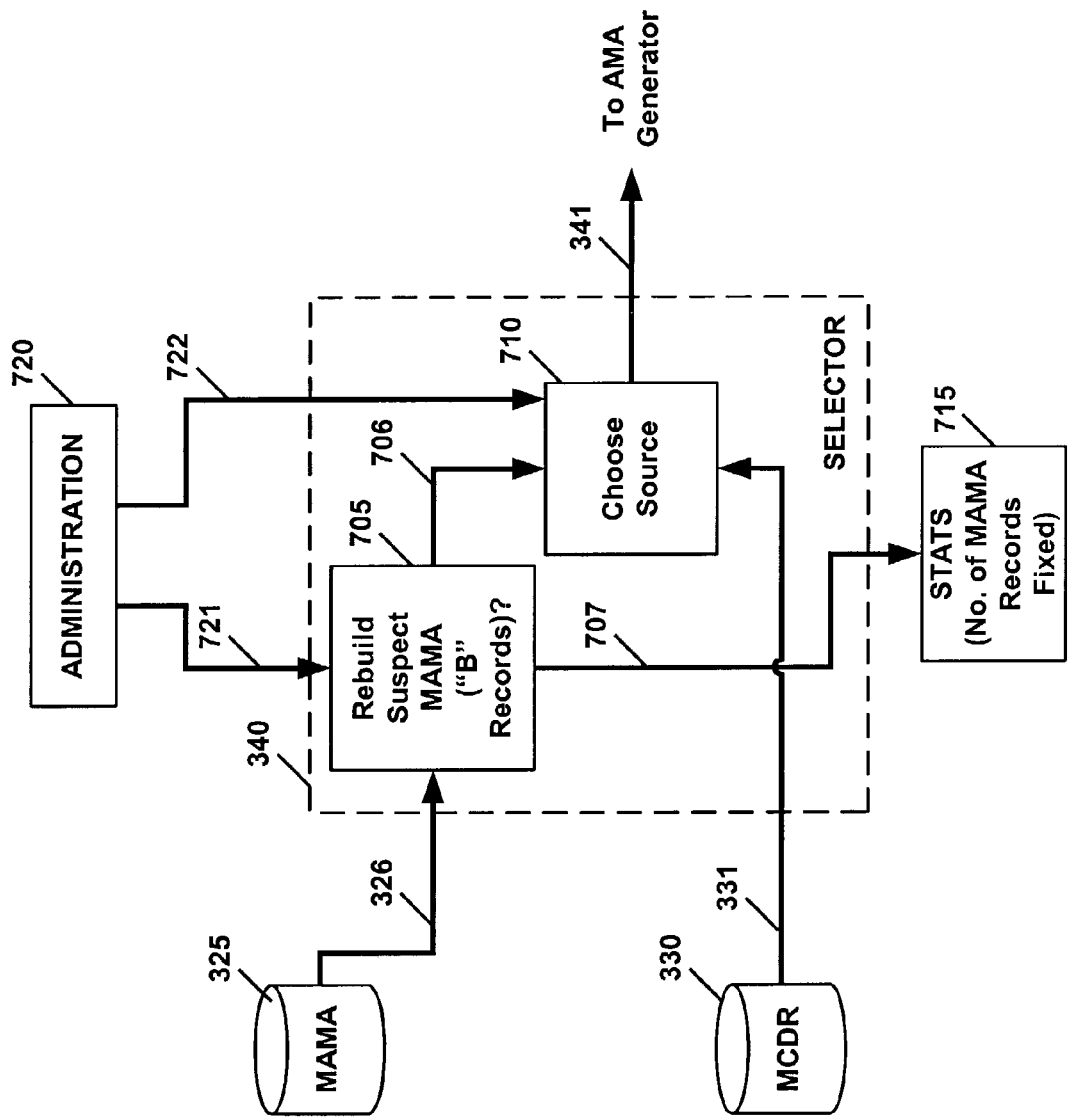
FIG. 7 is a detailed block diagram for a selection component of the automatic message accounting format record creation system of FIG. 2, according to an embodiment of the present invention.

FIG. 7 is a detailed block diagram for selector component 340 of FIG. 3, according to an embodiment of the present invention. In FIG. 7, selector component 340 may include a rebuild decision subcomponent 705 coupled to a choose source subcomponent 710. Rebuild decision subcomponent 705 may be coupled to MAMA storage subcomponent 325 via MAMA storage subcomponent communication path 326 and coupled to choose source subcomponent 710 via rebuild subcomponent communication path 706. Rebuild decision subcomponent 705 determines, for each "B" record whether to rebuild or augment the MAMA with MCDR data in AMA generator 345. Rebuild decision subcomponent 705 may be configured to output statistics 715 via a rebuild subcomponent statistics communication path 707. In general, rebuild subcomponent statistics communication path 707 may be coupled to standard storage and/or printing devices for storing and printing of the statistics.

In FIG. 7, in accordance with an embodiment of the present invention, choose source subcomponent 710 may be coupled to MCDR storage subcomponent 330 via MCDR storage subcomponent communication path 331. Choose source subcomponent 710 may be coupled to AMA generator 345 of FIG. 3 via selector communication path 341. Choose source subcomponent 710 may select which type or types of accounting record information that is, MAMA and/or MCDR, may be sent to AMA Generator 345.

In FIG. 7, in accordance with an embodiment of the present invention, an administration component 720 may be coupled to selector component 340. Specifically, administration component 720 may be coupled to rebuild decision subcomponent 705 via a first administration component communication path 721, and choose source subcomponent 710 via a second administration component communication path 722. Administration component 720 may control the operation of rebuild decision subcomponent 705 by providing user controlled on and off signals via first administration component communication path 721. Similarly, administration component 720 may also control the operation of choose source subcomponent 710 by providing user controlled source selection criteria.

Figure 8:
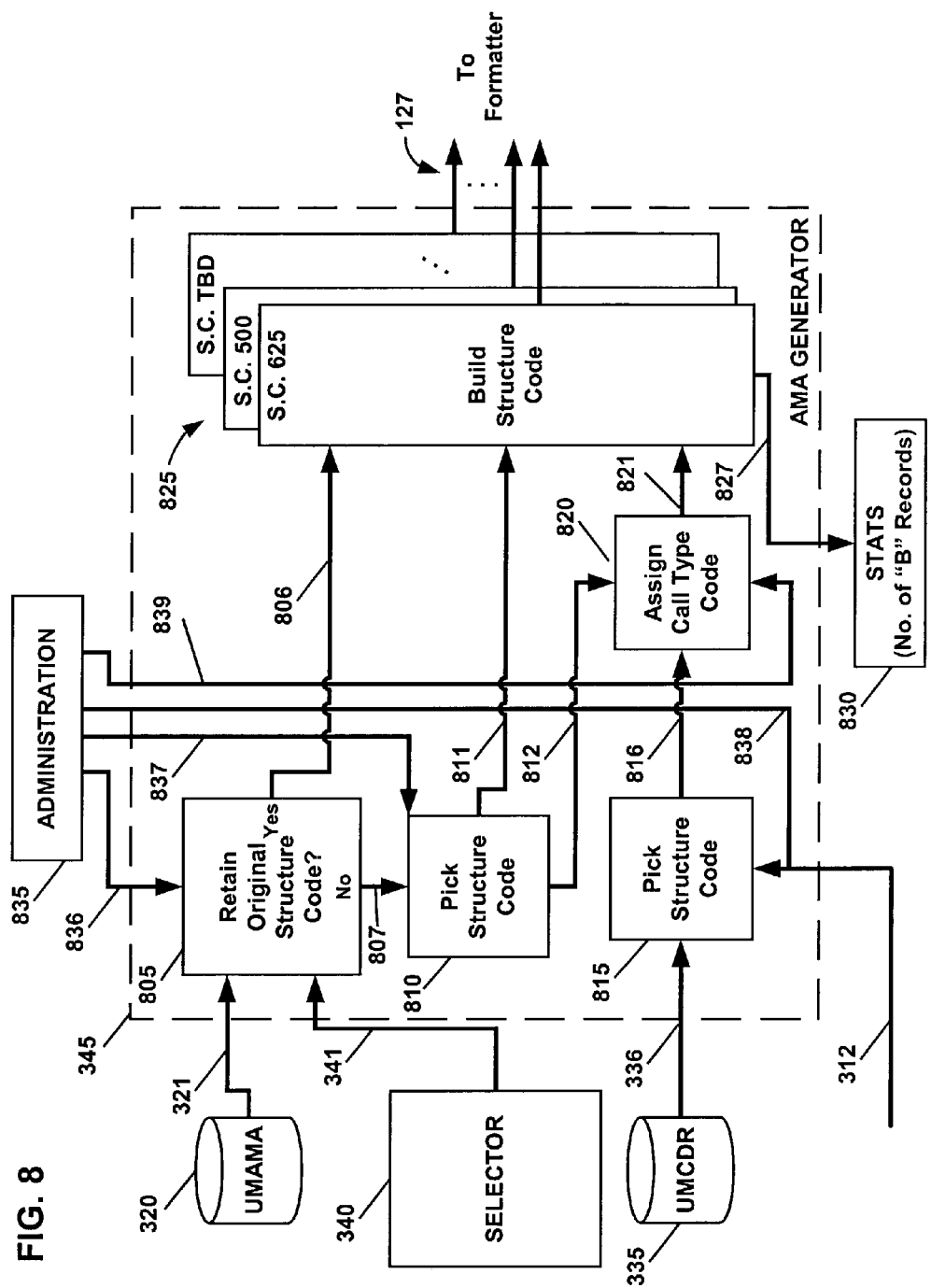
FIG. 8 is a detailed block diagram for a message accounting record generation component of the automatic message accounting format record creation system of FIG. 2, according to an embodiment of the present invention.

FIG. 8 is a detailed block diagram for AMA record generator component 345 of FIG. 2, according to an embodiment of the present invention. In FIG. 8, AMA record generator component 345 may include a retain original structure code subcomponent 805 coupled to a first pick structure code component 810 and at least one build structure subcomponent 825. First pick structure code component 810 may be coupled to an assign call type code subcomponent 820 and at least one build structure subcomponent 825. AMA record generator component 345 may also include a second pick structure code subcomponent 815 coupled to assign call type code subcomponent 820. Second pick structure code subcomponent 815 may be coupled to signaling network call record by-pass communication path 312.

In FIG. 8, in accordance with an embodiment of the present invention, retain original structure code subcomponent 805 may be coupled to UMAMA storage subcomponent via UMAMA storage subcomponent communication path 321 and to selector component 340 via selector component communication path 341. Retain original structure code subcomponent 805 may be coupled to at least one build structure subcomponent 825 via a retain original structure code subcomponent YES communication path 806. Retain original structure code subcomponent 805 may be coupled to first pick structure code component 810 via a retain original structure code subcomponent NO communication path 807.

In FIG. 8, in accordance with an embodiment of the present invention, first pick structure code subcomponent 810 may be coupled to at least one build structure subcomponent 825 via a first communication path 811 and may be coupled to assign call type code 820 via a second communication path 812. Second pick structure code subcomponent 815 may be coupled to UMCDR storage subcomponent 335 via UMCDR storage subcomponent communication path 336 and may be coupled to CDR receiver subcomponent 310 via bypass communications path 312. Second pick to assign call type code subcomponent 820 via a second pick structure code subcomponent communication path 816.

In FIG. 8, in accordance with an embodiment of the present invention, assign call type code subcomponent 820 may be further coupled to at least one build structure code subcomponent 825 via an assign call type code subcomponent communication path 821. At least one build structure code subcomponent 825 may be coupled to the formatter component 350 of FIG. 3 (not shown) via AMA record communication path 127. At least one build structure code subcomponent 825 may also be configured to output statistics 830 via an at least one build structure code subcomponent communication path 827. In general, at least one build structure code subcomponent communication path 827 may be coupled to standard storage and/or printing devices for storing and printing of the statistics.

In FIG. 8, in accordance with an embodiment of the present invention, an administration component 835 may be coupled to retain original structure code component 805, first pick structure code component 810, second pick structure code component 815 and assign call type code component 820. Specifically, administration component 835 may be coupled to retain original structure code component 805 via a first administration component communication path 836, first pick structure code component 810 via a second administration component communication path 837, second pick structure code component 815 via a third administration component communication path 838, and assign call type code component 820 via a fourth administration component communication path 839.

Figure 9:
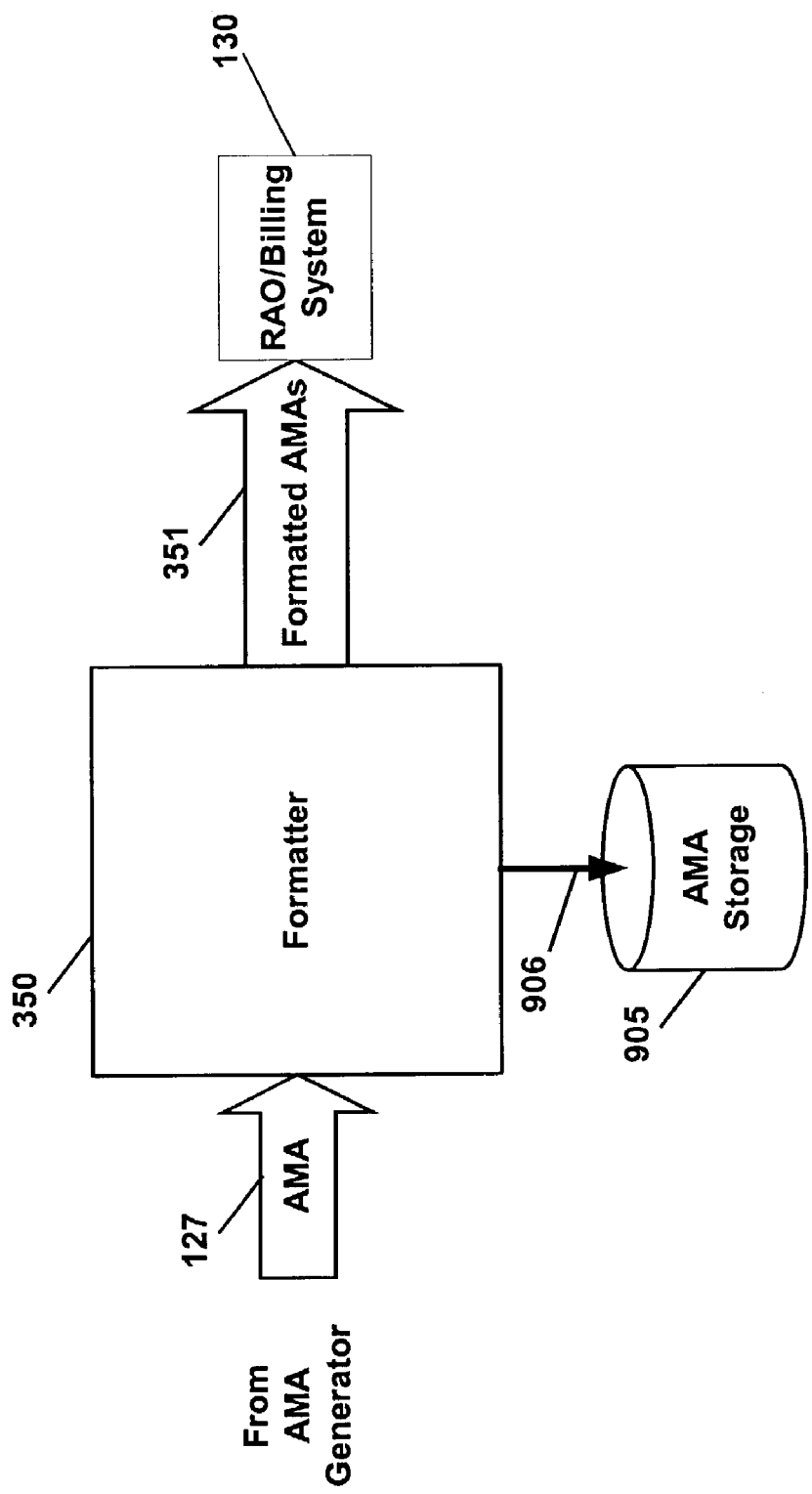
FIG. 9 is a detailed block diagram for a message accounting record formation component of the automatic message accounting format record creation system of FIG. 2, according to an embodiment of the present invention.

FIG. 9 is a detailed block diagram for a formatter component 350 of FIG. 3, according to an embodiment of the present invention. In FIG. 9, formatter component 350 may be coupled to an AMA storage component 905 via formatter component communication path 906. Formatter component 350 may also be coupled to the AMA generator (not shown) of FIG. 3 via AMA record communication path 127. Formatter component 350 may further be coupled to the RAO/billing System 130 via formatted AMA record communication path 351.

Figure 10:
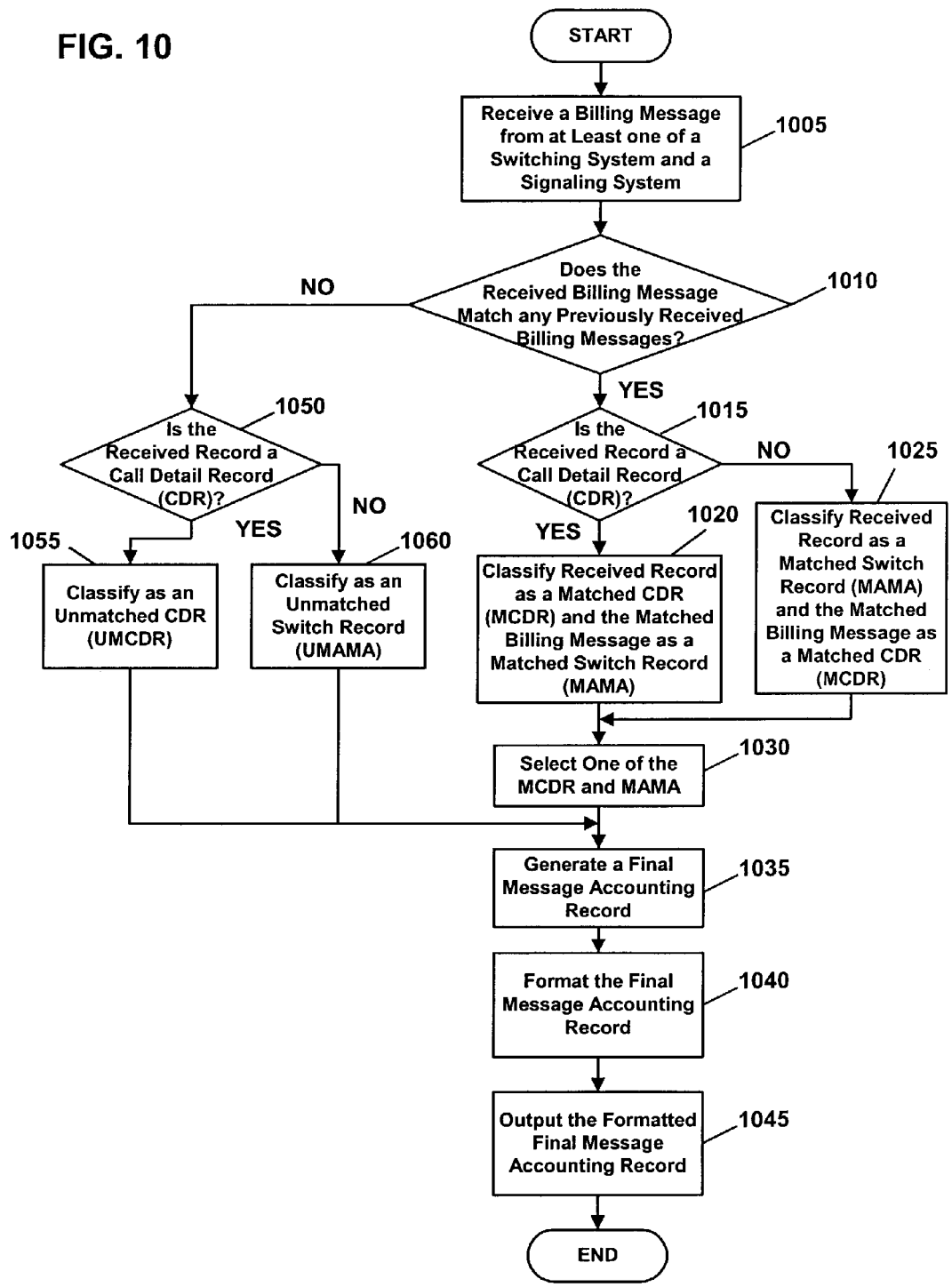
FIG. 10 is a detailed flow diagram for a method of providing augmented communication system billing records, according to an embodiment of the present invention.

FIG. 10 is a detailed flow diagram for a method of providing augmented communication system billing records, according to an embodiment of the present invention. In FIG. 10, a billing message may be received (1005) from each of a switching system and a signaling system. For example, in FIG. 3, AMA receiver 305 may receive (1005) one or more AMA messages from system switching point 115 and/or CDR receiver 310 may receive (1005) one or more CDR messages from link monitoring system 120 and/or STP 110 with LMS functionality. Returning to FIG. 10, whether any of the received billing messages match (1010) each other or any other previously received billing messages may be determined. If there is a match (1010), whether the received message is a CDR may be determined (1015). If the received message is determined (1015) to be a CDR, the message may be classified (1020) as a MCDR and the matched message may be classified (1020) as a MAMA. If the received message is determined not to be a CDR, the message may be classified (1025) as a MAMA and the matched message may be classified (1020) as a MCDR in, for example, comparator-categorizer 315 of FIG. 3. Regardless, of how the message is classified, in FIG. 10, one of a pair of MAMA and MCDR associated with the same call may be selected (1030) in, for example, selector 340 of FIG. 3. Referring again to FIG. 10, if a billing message does not match (1010) any other received billing messages, whether the received message is a CDR may be determined (1050). If the received message is determined (1050) to be a CDR, the message may be classified (1055) as a UMCDR. If the received message is determined (1050) not to be a CDR, the message may be classified (1060) as a UMAMA in, for example, comparator-categorizer 315 of FIG. 3.

In FIG. 10, a final message accounting record may be generated (1035) for each call in, for example, AMA Generator 345 of FIG. 3, using the selected MAMA or MCDR, the UMCDR or the UMAMA associated with the call. In FIG. 10, a final message accounting record may be formatted (1040) in, for example, formatter 350 of FIG. 3, into a final billing format that may be used by the RAO/Billing System 130 of FIG. 1. Returning to FIG. 10, the formatted final message accounting record may be output by, for example, formatter 350 of FIG. 3.

Figure 11:
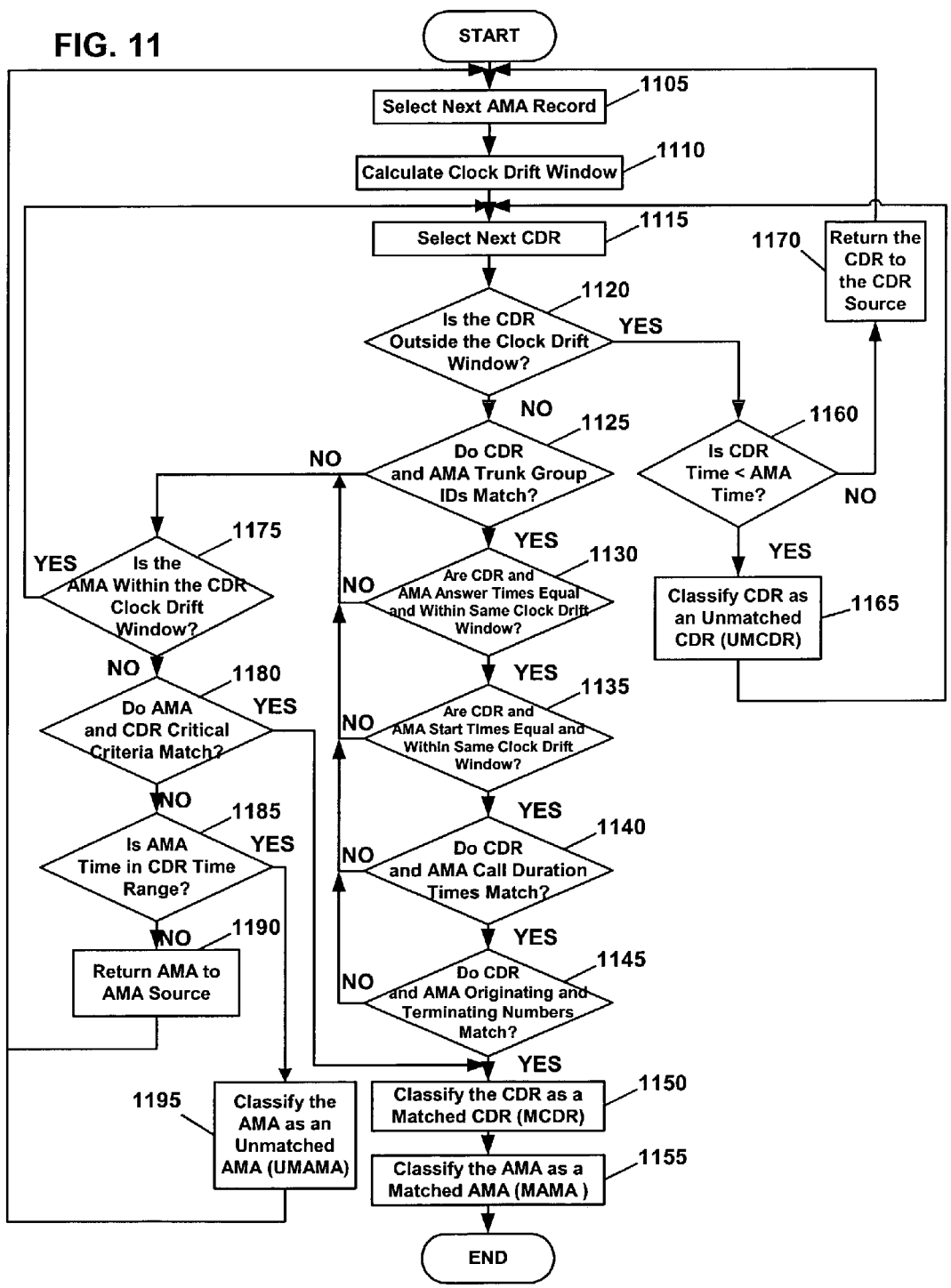
FIG. 11 is a detailed flow diagram for a method of categorizing network message accounting records, according to an embodiment of the present invention.

FIG. 11 is a detailed flow diagram for a method of categorizing network message accounting records, according to an embodiment of the present invention. In FIG. 11, in accordance with an embodiment of the present invention, the following description of categorizing the network message accounting records may all occur in comparator-categorizer 315 of FIG. 3. Returning to FIG. 11, a next AMA record may be selected (1105) from the plurality of AMA records in the AMA source, a clock drift window may be calculated (1110) for the selected AMA record, and a next CDR may be selected (1115) from the plurality of CDRs in the CDR source. Whether the CDR is outside the clock drift window may be determined (1120), and, if the CDR is determined (1120) not to be outside, that is, inside, of the clock drift window, whether the trunk group IDs for the AMA record and the CDR match may be determined (1125). If the trunk group IDs for the AMA record and the CDR are determined (1125) to match, whether the CDR and AMA answer times are equal and within the same clock drift window may be determined (1135). If the CDR and AMA answer times are determined (1135) to be equal and within the same clock drift window, whether the CDR and AMA call duration times match may be determined (1140). If the CDR and AMA call duration times are determined (1140) to match, whether the CDR and AMA originating and terminating numbers match may be determined (1145). If the CDR and AMA originating and terminating numbers are determined (1145) to match, the CDR may be classified (1150) as a matched CDR (MCDR), the AMA record may be classified (1155) as a matched AMA (MAMA) record, and the method may stop the classification of the CDR and the AMA. Of course, although not shown, it should be clearly understood that the method may continue with the next AMA record and next CDR stored in their respective sources.

In FIG. 11, if the trunk group IDs for the AMA record and the CDR are determined (1125) not to match, if the CDR and AMA answer times are determined (1130) not to be equal and within the same clock drift window, or if the CDR and AMA start times are determined (1135) not to be equal and within the same clock drift window, or if the CDR and AMA call duration times are determined (1140) not to match, or if the CDR and AMA originating and terminating numbers are determined (1145) not to match, whether the AMA is within the CDR clock drift window may be determined (1175). If the AMA is within the CDR clock drift window, the next CDR may be selected (1115). If the AMA is not within the CDR clock drift window, whether the AMA and CDR critical criteria match may be determined (1180). If the AMA and CDR critical criteria are determined (1180) to match, the CDR may be classified (1150) as a matched CDR (MCDR), the AMA record may be classified (1155) as a matched AMA (MAMA) record, and the method may stop the classification of the CDR and the AMA. Of course, as above, although not shown, it should be clearly understood that the method may continue with the next AMA record and next CDR stored in their respective sources. If the AMA and CDR critical criteria are determined (1180) not match, whether the AMA time is in the CDR time range may be determined (1185). If the AMA time is determined (1185) to be in the CDR time range, the AMA record may be classified (1195) as an unmatched AMA (UMAMA) and the next AMA record may be selected (1105). If the AMA time is determined (1185) not to be in the CDR time range, the AMA record may be returned (1190) to the AMA source and the next AMA record may be selected (1105).

In FIG. 11, if the CDR is determined (1120) to be outside of the clock drift window, which may be an indication that the CDR and AMA record are associated with different calls, whether the CDR time is less than the AMA record time may be determined (1160). If the CDR time is determined (1160) not to be less than the AMA record time, the CDR may be returned (1170) to the CDR source for future selection (1105). If the CDR time is determined (1160) to be less than the AMA record time, the CDR may be classified (1165) as an unmatched CDR (UMCDR) and the method may select (1115) the next CDR.

Figure 12:
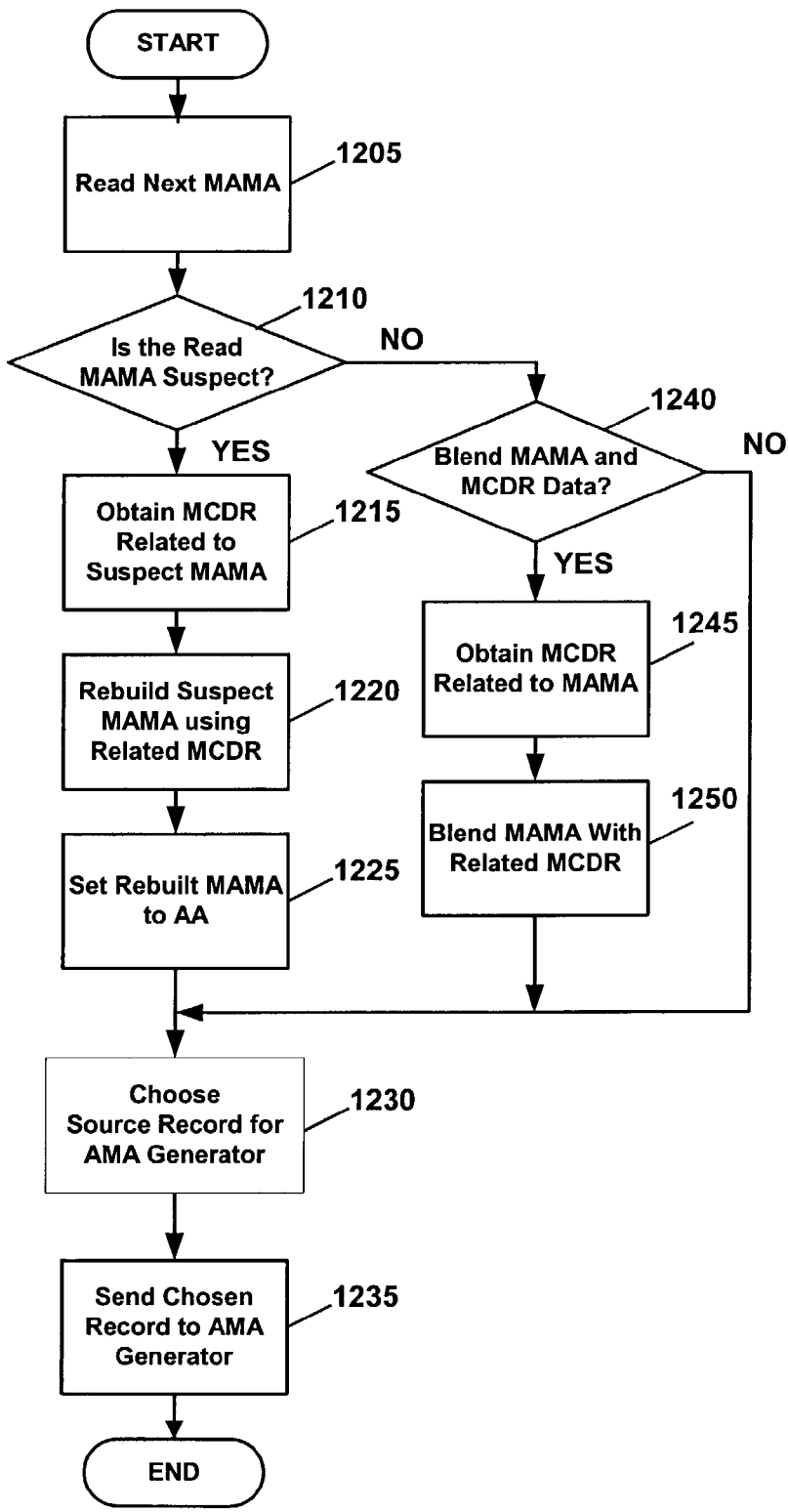
FIG. 12 is a detailed flow diagram for a method of selecting matching switching and signaling network call records, according to an embodiment of the present invention.

FIG. 12 is a detailed flow diagram for a method of selecting matching switching and signaling network call records, according to an embodiment of the present invention. In FIG. 12, in accordance with an embodiment of the present invention, the following description of selecting matching switching and signaling network call records may all occur in selector 340 of FIG. 3. Returning to FIG. 12, a next MAMA record may be read (1205) from, for example, MAMA storage 325 of FIG. 3. In FIG. 12, whether the accuracy of the read (1205) MAMA record is suspect may be determined (1210). If the accuracy of the read (1205) MAMA record is determined (1210) to be suspect, an MCDR related to the suspect MAMA record may be obtained (1215) from, for example, MCDR storage 330 of FIG. 3. The suspect MAMA record may be rebuilt (1220) using the related MCDR and the rebuilt MAMA record may be set (1225) to be a non-suspect MAMA record. A source record may be chosen (1230), the chosen source record may be sent to AMA generator 345 of FIG. 3, and, returning to FIG. 12, the method may terminate.

In FIG. 12, If the accuracy of the read (1205) MAMA record is determined (1210) not to be suspect, whether an MCDR related to the MAMA record is to be blended with the MAMA record may be determined (1240). If it is determined (1240) that the MCDR related to the MAMA record is to be blended with the MAMA record, the MCDR related to the MAMA record may be obtained (1245) and the MAMA record may be blended with the related MCDR.—A source record may be chosen (1230), the chosen source record may be sent to AMA generator 345 of FIG. 3, and, returning to FIG. 12, the method may terminate. Similarly, if it is determined (1240) that the MCDR related to the MAMA record is not to be blended with the MAMA record, a source record may be chosen (1230), the chosen source record may be sent to AMA generator 345 of FIG. 3, and, returning to FIG. 12, the method may terminate.

Figure 13:
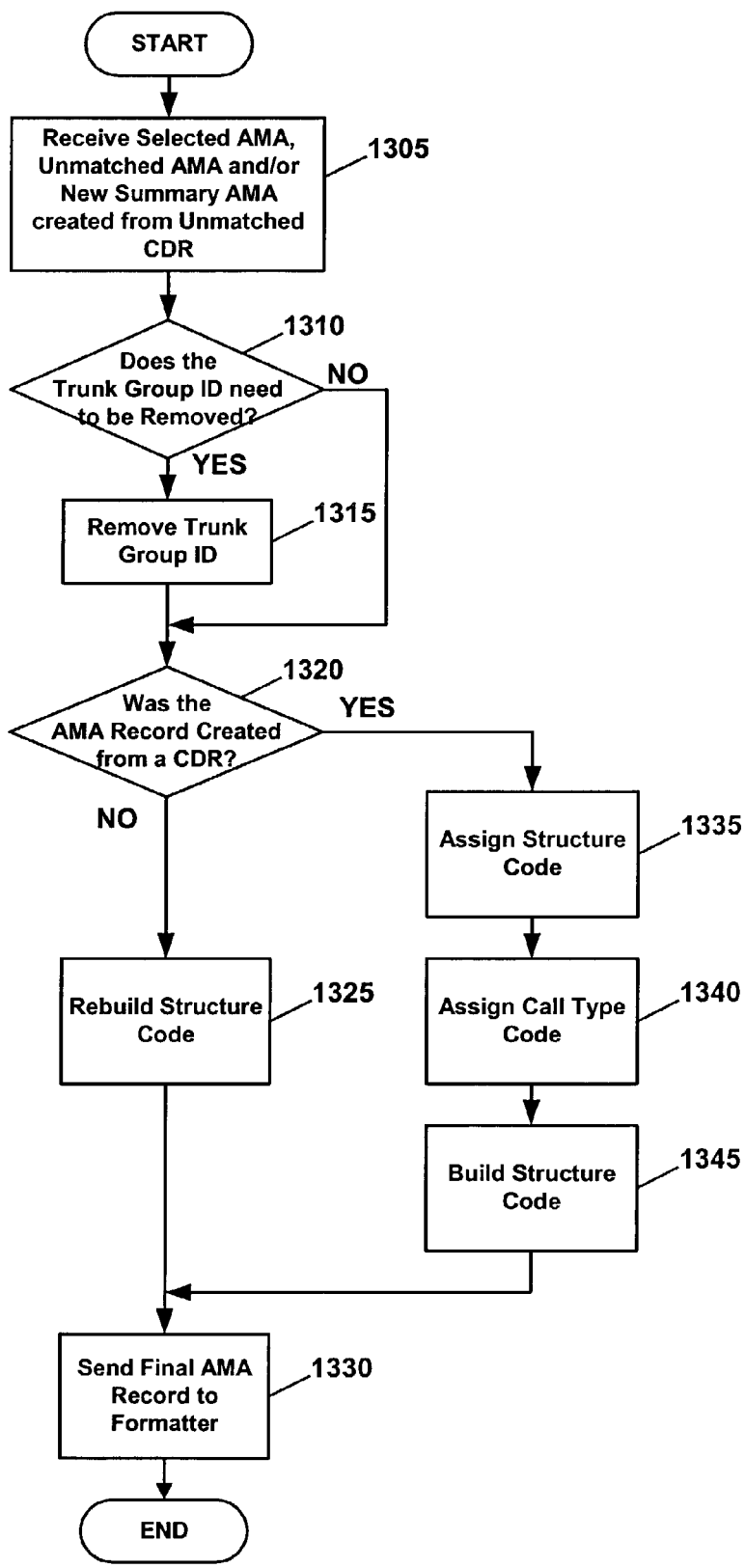
FIG. 13 is a detailed flow diagram for a method of generating final network message accounting records, according to an embodiment of the present invention.

FIG. 13 is a detailed flow diagram for a method of generating final network message accounting records, according to an embodiment of the present invention. In FIG. 13, in accordance with an embodiment of the present invention, the following description of generating final network message accounting record may all occur in AMA generator 345 of FIG. 3. In FIG. 13, selected AMA, UMAMA and/or new summary AMA records created from UMCDRs may be received (1305) and whether the trunk group ID needs to be removed may be determined (1310). If the trunk group ID is determined (1310) to need to be removed, the trunk group ID is removed (1315) from the records and whether the AMA record was created from a CDR may be determined (1320). Similarly, If the trunk group ID is determined (1310) not to need to be removed, whether the AMA record was created from a CDR may be determined (1320). If the AMA record was determined (1320) not to have been created from a CDR, the structure code of the AMA record may be rebuilt (1325), the final AMA record may be sent (1330) to formatter 350 of FIG. 3, returning to FIG. 13, the method may terminate. If the AMA record was determined (1320) to have been created from a CDR, a structure code may be assigned (1335), a call type code may be assigned (1340), the structure code of the AMA record may be rebuilt (1345), the final AMA record may be sent (1330) to formatter 350 of FIG. 3, and returning to FIG. 13, the method may terminate.

In accordance with an embodiment of the present invention, a system for providing augmented billing messages includes a message accounting record creation apparatus in communication with a signaling network and a switching network. The message accounting record creation apparatus may receive a multiple call records from the signaling network and a multiple message accounting records for the switching network and output multiple augmented message accounting records. Each of the output augmented message accounting records may be generated using one of the signaling network call records and one of the switching network message accounting records.

In accordance with an embodiment of the present invention, a method of providing augmented communication system billing records, includes receiving a signaling network call record for a call, receiving a switching network automatic message accounting record for the call, and categorizing the received signaling network call record and the switching network automatic message accounting record as being matched records. The method may also include selecting one of the matched signaling network call record and the matched switching network automatic message accounting record associated with the call, generating a final message accounting record from the selected matched accounting record, and outputting the final message accounting record.

In accordance with an embodiment of the present invention, a machine readable medium may have stored thereon a plurality of executable instructions to perform a method including receiving a signaling network call record for a call receiving a switching network automatic message accounting record for the call, and categorizing the received signaling network call record and the switching network automatic message accounting record as being matched records. The method may also include selecting one of the matched signaling network call record and the matched switching network automatic message accounting record associated with the call, generating a final message accounting record from the selected matched accounting record, and outputting the final message accounting record.

In accordance with an embodiment of the present invention, an apparatus for providing augmented billing messages may include a processor and a memory coupled to the processor. The memory may store instructions adapted to be executed by the processor to output an augmented billing message for a call based upon a billing message associated with the call from a switch and call data associated with the call from a signaling system.

In accordance with an embodiment of the present invention, a method for providing augmented billing messages, may include receiving a call accounting message from a switch, receiving a call record from a signaling system and outputting an augmented billing message based on the received call accounting message and the received call record.

In accordance with an embodiment of the present invention, a system for providing augmented billing messages, may include means for receiving message accounting records from a switch means for receiving call detail records (CDRs) from a signaling system and means for outputting an augmented billing message based on the received message accounting records and the received CDRs.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A system for providing augmented billing messages comprising:
    a message accounting record creation apparatus being in communication with a signaling network and a switching network, said message accounting record creation apparatus to receive a plurality of call records from said signaling network and a plurality of message accounting records from said switching network and output a plurality of augmented message accounting records, each of said output plurality of augmented message accounting records being generated using one of the plurality of signaling network call records and one of the plurality of switching network message accounting records,
    wherein said message accounting record creation apparatus comprises:
    a switching network automatic message accounting record receiver component to receive said switching network automatic message accounting record;
    a signaling network call record receiver component to receive said signaling network call record;
    a comparison component in communication with said switching network automatic message accounting record receiver component and said signaling network call record receiver component, said comparison component to output each of said switching network message accounting record and said signaling network call record as one of a matched record and an unmatched record;
    a selection component in communication with said comparison component, said selector component to output a selected matched record, if said switching network automatic message accounting record and said signaling network call record are matched;
    a message accounting record generation component in communication with said selection component and said comparison component, said message accounting record generation component to generate final message accounting information; and
    a message accounting record formation component in communication with said message accounting record generation component, said message accounting record formation component to output said final message accounting information as said augmented message accounting record.

2. The system of claim 1 wherein said switching network automatic message accounting record receiver component comprises:
    a bypass module in communication with said switching network;
    a plurality of switch type interfaces in communication with said switching network, said plurality of switch type interfaces to receive said plurality of switching network automatic message accounting records and output said plurality of switching network automatic message accounting records; and
    an alternate media switch type interface in communication with said switching network.

3. The system of claim 2 wherein said switching network automatic message accounting record receiver component further comprises:
    an administration module in communication with said bypass module and said plurality of switch type interfaces, said administration module to provide data processing management system services to include:
    set switch polling frequency; and
    obtain at least one switching network automatic message accounting record at a predetermined time interval.

4. The system of claim 3 wherein said predetermined time interval comprises at least one of:
    hours;
    days;
    weeks; and
    months.

5. The system of claim 2 wherein said switching network message accounting record receiver component further comprises:
    a switching network automatic message accounting record storage component in communication with said plurality of switch type interfaces, said switching network automatic message accounting record storage component to receive and store said output plurality of switching network automatic message accounting records.

6. The system of claim 1 wherein said signaling network call record receiver component comprises:
    a plurality of signaling network interfaces in communication with said signaling network, said plurality of interfaces to receive said plurality of signaling network call records and output said plurality of signaling network call records;
    a field resort component to receive said output plurality of signaling network call records, resort a plurality of fields in each signaling network call record, and output each of said resorted signaling network call record;
    a switch filter component to receive each of said output resorted signaling network call records, said switch filter to sort each of said received resorted signaling network call records by origination switch;
    a filer component coupled to said switch filter component, said filer component to store said sorted signaling network call records and output said sorted signaling network call records; and
    a field filter component coupled to said filer component to receive said sorted signaling network call records, filter out unnecessary fields in said sorted signaling network call records, and output said filtered sorted signaling network call records.

7. The system of claim 6 further comprising:
    an administration module in communication with said signaling network interfaces and said switch filter component and said field filter component, said administration module to set filter values in said switch filter component and said field filter component.

8. The system of claim 1 wherein said comparison component comprises:
    a compare subcomponent including a plurality of compare criteria units, said compare subcomponent to compare said plurality of signaling network call records with said switching network message accounting records and output a plurality of unmatched signaling network call records, a plurality of unmatched switching network automatic message accounting records;
    a categorize subcomponent in communication with said compare subcomponent, said categorize subcomponent to receive said plurality of matched signaling network call records and said plurality of switching network automatic message accounting records, and to output said plurality of matched signaling network call records and said plurality of matched switching network automatic message accounting records; and
    a storage subcomponent in communication with said compare subcomponent and said categorize subcomponent, said storage subcomponent to receive and store said unmatched signaling network call records, said unmatched switching network message accounting records, said matched signaling network call records, and said matched switching network automatic message accounting records.

9. The system of claim 8 wherein said storage subcomponent comprises:
   an unmatched switching network message accounting record storage unit in communication with said categorize subcomponent, said unmatched switching network message accounting record storage unit to store and output said plurality of unmatched switching network message accounting records;
   a matched switching network message accounting record storage unit in communication with said categorize subcomponent, said matched switching network message accounting record storage unit to store and output said plurality of matched switching network message accounting records;
   a matched signaling network call record storage unit in communication with said categorize subcomponent, said matched signaling network call record storage unit to store and output said plurality of matched signaling network call records; and
   an unmatched signaling network call record storage unit in communication with said categorize subcomponent, said unmatched signaling network call record storage unit to store and output a plurality of unmatched signaling network call records.

10. The system of claim 8 wherein said storage subcomponent is adapted to output statistical results of sorting each type of said network message accounting records.

11. The system of claim 8 wherein said compare subcomponent further comprises:
    a plurality of inputs to receive compare criteria, said compare criteria to be used to compare said plurality of signaling network call records with said switching network message accounting records.

12. The system of claim 1 wherein said selector component comprises:
    a rebuild decision subcomponent in communication with said categorize component, said rebuild decision subcomponent to determine whether to rebuild suspect matched switching network automatic message accounting record; and
    a choose source subcomponent in communication with said categorize component and said rebuild design subcomponent, said choose source subcomponent to select between a matched pair of switching network message accounting and signaling network call records, and output said selected matched network record.

13. The system of claim 12 wherein said rebuild design subcomponent comprises:
    a first input to receive said plurality of switched network automatic message accounting and records;
    a second input to receive a rebuild option signal;
    a first output coupled to said choose source subcomponent and;
    a second output to output statistical information on said rebuilt suspect matched switching network automatic message accounting records.

14. The system of claim 12 wherein said choose source subcomponent further comprises:
    a first input coupled to said first output of said rebuild design subcomponent;
    a second input to receive a selection signal, said choose source subcomponent to use said selection signal to select one of said pair of matched switching network automatic message accounting record and said matched signaling network call record;
    a third input to receive said plurality of matched signaling network call records; and
    an output to output said selected matched network record.

15. The system of claim 1 wherein said message accounting record generator component comprises:
    a retain original structure code subcomponent in communication with said compare component and said selector component, said retain original structure code subcomponent to determine whether to use the original structure code of said pluralities of matched and unmatched switching network automatic message accounting records;
    a first pick structure code subcomponent in communication with said retain original structure code subcomponent, said first pick structure code subcomponent to select a structure code for said pluralities of matched and unmatched switching network automatic message accounting records and said plurality of matched signaling network call records;
    a second pick structure code subcomponent in communication with said compare component, said second pick structure code subcomponent to select the structure code for said plurality of unmatched signaling network call records;
    an assign call type code subcomponent in communication with said first and second pick structure code subcomponents, said assign call type code subcomponent to assign a call type code to each of said pluralities of matched and unmatched signaling network call records; and
    a plurality of build structure code subcomponents in communication with said retain original structure code subcomponent, said first pick structure code subcomponent and said assign call type code subcomponent, each of said plurality of build structure code subcomponents to rebuild the structure of said pluralities of matched and unmatched switching network message accounting records and the structure of said pluralities matched and unmatched signaling network call records.

16. The system of claim 15 wherein said retain original structure code subcomponent further comprises:
    a first output to output first portion of said pluralities of matched and unmatched switching network automatic message accounting records determined to retain the original structure code of said plurality of matched and unmatched switching network automatic message accounting records; and
    a second output to output a second portion of said pluralities matched and unmatched switching network automatic message accounting records determined not to retain the original structure code of said plurality of matched and unmatched switching network automatic message accounting records.

17. The system of claim 15 wherein said first pick structure code subcomponent further comprises:
    a first input to receive said matched and unmatched switching network message accounting records and said matched signaling network call records determined not to retain their original structure code;
    a first output to output said matched and unmatched switching network automatic message accounting records and said matched signaling network call records in said selected structure code; and a second output to output said matched signaling network call records in said selected structure code.

18. The system of claim 15 wherein said second pick structure code subcomponent further comprises:

a first input to receive said unmatched signaling network call records; and a first output to output said unmatched signaling network call records in said selected structure code.

19. The system of claim 15 wherein said assign call type code subcomponent further comprises:

a first input to receive said matched signaling network call records in said selected structure code;

a second input to receive said unmatched signaling network call records in said selected structure code; and an output to output each of said matched and unmatched signaling network call records in said selected structure code with said assigned call type code.

20. The system of claim 15 wherein each of said plurality of build structure code subcomponents further comprises:

a first input to receive said matched and unmatched switching network automatic message accounting records determined to retain their original structure code;

a second input to receive said matched and unmatched switching network automatic message accounting records and said matched signaling network call records in said selected structure code;

a third input to receive each of said matched and unmatched signaling network call records in said selected structure code with said assigned call type code; and an output to output each of said rebuilt matched and unmatched switching network automatic message accounting records and said rebuilt matched and unmatched signaling network call records.

21. The system of claim 20 further comprising a plurality of inputs to receive data processing management system inputs.

22. The system of claim 21 wherein said plurality of inputs is in communication with an administration subcomponent, which provides said data processing management system inputs.

23. The system of claim 1 further comprising an automatic message accounting formatter to receive an output data stream from said message accounting record creator system; convert said received output data stream into a predetermined format from a plurality of standard accounting formats; and output said received output data stream in said predetermined standard accounting format.

24. The system of claim 23 wherein said plurality of standard accounting formats comprises:

an automatic message accounting data network system format; and an automatic message accounting teleprocessing system format.

25. The system of claim 23 wherein said automatic message accounting formatter comprises:

an input to receive said output data stream;

a first output to output said received output data stream in said predetermined standard accounting format; and a second output to output said received output data stream.

26. The system of claim 25 further comprising:

a storage component in communication with said automatic message accounting formatter to receive said output data stream.

27. The system of claim 1 wherein said signaling network call record comprises:

a call detail record (CDR).

28. The system of claim 27 wherein said CDR comprises:

a plurality of call detail information obtained from at least one signaling system 7 (SS7) network message associated with a call.

29. The system of claim 28 wherein said plurality of call detail information comprises:

a call start time;

a call end time;

a call answer time;

an originating telephone number;

a terminating telephone number;

an originating point code;

a terminating point code; and a trunk circuit identification code.

30. The system of claim 1 further comprising:

a link monitoring system (LMS) in communication with said signaling network and said message accounting record creation apparatus, said LMS to receive at least one message signaling unit from said signaling network and output a call detail record (CDR) to said message accounting record creation apparatus.

31. The system of claim 1 wherein said message accounting record creation apparatus is coupled to said signaling network by a signaling transfer point (STP) to receive said plurality of signaling network call records.

32. A method of providing augmented communication system billing records, the method comprising:

receiving a signaling network call record for a call;

receiving a switching network automatic message accounting record for said call;

categorizing said received signaling network call record and said switching network automatic message accounting record as being matched records;

selecting one of said matched signaling network call record and said matched switching network automatic message accounting record associated with said call;

generating a final message accounting record from said selected matched accounting record; and outputting said final message accounting record.

33. The method of claim 32 wherein said outputting said final message accounting record comprises:

formatting said final message accounting record; and outputting said formatted final message accounting record.

34. The method of claim 33 wherein said outputting operation comprises:

outputting said final message accounting record to a storage medium; and outputting said formatted final message accounting record to a final communication system billing system.

35. The method of claim 33 wherein said categorizing operation comprises:

comparing said received switching network automatic message accounting record and said received signaling network call record.

36. The method of claim 35 wherein said categorizing operation further comprises at least one of:
  categorizing said received switching network automatic message accounting record as an unmatched switching record, if no associated signaling network call data is received;
  categorizing said received switching network automatic message accounting record as a matched switching record, if an associated signaling network call data is received;
  categorizing said received signaling network call detail record as an unmatched signaling record, if no associated switching network automatic message accounting record is received; and
  categorizing said received signaling network call detail record as a matched signaling record, if an associated switching network automatic message accounting record is received.

37. The method of claim 36 further comprising:
  outputting each of said received matched switching records, said unmatched switching records, said matched signaling records, and said unmatched signaling records.

38. The method of claim 32 wherein said selecting said matched accounting record comprises:
  selecting a best one of said matched switching network message accounting record and said matched signaling network call record.

39. The method of claim 38 wherein said selecting said best one of operation comprises:
  selecting said matched switching network automatic message accounting record, if said matched switching network automatic message accounting record contains more accurate information than said matched signaling network call record; and
  selecting said matched signaling network call record, if said matched signaling network call record contains more accurate information than said switching network automatic message accounting record.

40. The method of claim 38 further comprising:
  correcting said matched switching network automatic message accounting record using said matched signaling network call record, if said matched switching network automatic message accounting record is determined to require correction; and
  selecting said matched accounting record from one of said corrected matched switching network automatic message accounting record, said matched switching network automatic message accounting record and said matched signaling network call record.

41. The method of claim 32 wherein said generating said final message accounting record comprises:
  assigning a new structure code to said matched accounting record, if said matched accounting record does not contain an original structure code; and
  building the structure of said matched accounting record using one of said new structure code and said original structure code associated with said matched accounting record.

42. The method of claim 41 further comprising:
  formatting said rebuilt matched accounting record into said final message accounting record.

43. The method of claim 41 further comprising:
  assigning a call type code to said matched accounting record, if said matched accounting record contains information from a matched signaling network call record.

44. The method of claim 41 further comprising:
  assigning a structure code to said unmatched signaling network call record; and
  rebuilding the structure of said unmatched signaling network call record using said assigned structure code.

45. The method of claim 41 further comprising:
  assigning a call type code to said unmatched signaling network call record.

46. A machine readable medium having stored thereon a plurality of executable instructions to perform a method comprising:
  receiving a signaling network call record for a call;
  receiving a switching network automatic message accounting record for said call;
  categorizing said received signaling network call record and said switching network automatic message accounting record as being matched records;
  selecting one of said matched signaling network call record and said matched switching network automatic message accounting record associated with said call;
  generating a final message accounting record from said selected matched accounting record; and
  outputting said final message accounting record.

47. The machine readable medium of claim 46 wherein said outputting said final message accounting record comprises:
  formatting said final message accounting record; and
  outputting said formatted final message accounting record.

48. The machine readable medium of claim 47 wherein said outputting operation comprises:
  outputting said received switching network message accounting record to a storage medium; and
  outputting said received switching network message accounting record to a final communication system billing system.

49. The machine readable medium of claim 46 wherein the method further comprises:
  outputting each said received signaling network call record.

50. The machine readable medium of claim 49 wherein said outputting each said received signaling network call record comprises at least one of:
  outputting said received signaling network call record for further augmentation processing; and
  outputting said received signaling network call record to a storage medium.

51. The machine readable medium of claim 46 wherein said categorizing each of said received at least one switching network message accounting record and said signaling network call record as being one of a matched record and an unmatched record comprises:
  comparing said received switching and signaling network call records.

52. The machine readable medium of claim 51 wherein said categorizing each of said received at least one switching network message accounting record and said signaling network call record as being one of a matched record and an unmatched record further comprises at least one of:
  categorizing said received switching network message accounting record as an unmatched switching record, if no associated signaling network call record is received;

categorizing said received switching network message accounting record as a matched switching record, if an associated signaling network call record is received;

categorizing said received signaling network call record as an unmatched signaling record, if no associated switching network message accounting record is received; and categorizing said received signaling network call record as a matched signaling record, if an associated switching network message accounting record is received.

53. The machine readable medium of claim 52 wherein the method further configure comprises:

outputting each of said received matched switching records, said unmatched switching records, said matched signaling records, and said unmatched signaling records.

54. An apparatus for providing augmented billing messages, comprising:

a processor; and a memory coupled to said processor, said memory storing instructions adapted to be executed by said processor to output an augmented billing message for a call based upon a billing message associated with the call from a switch and call data associated with the call from a signaling systems, wherein said instructions are further adapted to be executed by said processor to:

compare the switch billing message with the signaling system call data, and generate the augmented billing message by modifying the switch billing message with information from the signaling system call data, if the switch billing message and the signaling system call data relate to the same call.

55. The apparatus of claim 54, wherein the signaling system call data is an SS7 ISUP message or a message signaling unit.

56. The apparatus of claim 54, wherein the signaling system call data is correlated into a call detail record.

57. The apparatus of claim 54, wherein the billing message from the switch is an automatic message accounting format message.

58. The apparatus of claim 54 wherein the signaling system call data is correlated into a call detail record prior to being received by said processor.

59. A method for providing augmented billing messages, including:

receiving a call accounting message from a switch;

receiving a call record from a signaling system; and outputting an augmented billing message based on the received call accounting message and the received call record, wherein said outputting the augmented billing message comprises:

comparing the call accounting message to the call record;

generating the augmented billing message based on the comparison; and outputting the generated augmented billing message.

60. The method of claim 59, wherein said receiving the call accounting message comprises:

receiving an automatic message account format message.

61. The method of claim 59, wherein said receiving the call record comprises:

receiving a message signaling unit.

62. The method of claim 59, wherein the call record is correlated into a call detail record.

63. The method of claim 59, wherein said generating the augmented billing message comprises:

creating the augmented billing message using only the call accounting message.

64. The method of claim 59, wherein said generating the augmented billing message comprises:

creating the augmented billing message using only the call record.

65. The method of claim 59, wherein said generating the augmented billing message comprises:

creating the augmented billing message using the call accounting message and the call record.

66. The method of claim 65 wherein said creating the augmented billing message comprises:

replacing all of the information in the call accounting message with corresponding information from the call record.

67. The method of claim 65 wherein said creating the augmented billing message comprises:

replacing all of the information in the call accounting message with corresponding information from the call record.

68. The method of claim 67 wherein said call accounting message is an automatic message accounting format message.

69. The method of claim 67 wherein said call record is a call detail record.

70. A system for providing augmented billing messages, including:

means for receiving message accounting records from a switch;

means for receiving call detail records (CDRs) from a signaling system; and means for outputting an augmented billing message based on the received message accounting records and the received CDRs, wherein said outputting means comprises:

means for comparing the message accounting records to the CDRs;

means for generating the augmented billing message based on the comparison; and means for outputting the generated augmented billing message.

71. The system of claim 70, wherein said generating the augmented billing message means comprises:

means for creating an augmented billing message based on one of the message accounting records associated with a call and one of the CDRs that is associated with the call.

* * * * *